(12) United States Patent
O'Byrne

(10) Patent No.: US 6,460,489 B1
(45) Date of Patent: Oct. 8, 2002

(54) DEVICE FOR HANDLING LIVESTOCK USING VIBRATION AND NOISE AS A STIMULATION ON EXTERNAL PORTIONS OF THE BODY

(76) Inventor: Timothy O'Byrne, Box 299, Consort, Alberta (CA), T0C-1B0

( * ) Notice: Subject to any disclaimer, the term of this patent is extended or adjusted under 35 U.S.C. 154(b) by 0 days.

(21) Appl. No.: 09/836,945

(22) Filed: Apr. 17, 2001

(51) Int. Cl.$^7$ .............................................. A01K 29/00
(52) U.S. Cl. ........................................ 119/908; 231/7
(58) Field of Search ................................ 119/174, 712, 119/719, 905, 908; 231/2, 7; 452/53, 54, 56–58; 600/38; 601/72, 70, 69, 80, 81; 604/22

(56) References Cited

U.S. PATENT DOCUMENTS

| | | | |
|---|---|---|---|
| 4,006,390 A | 2/1977 | Levine | 317/262 S |
| D244,626 S | 6/1977 | Andrews | D30/32 |
| 4,069,816 A * | 1/1978 | Yamamura et al. | 128/41 |
| 4,084,218 A | 4/1978 | Kenney | 363/18 |
| D250,050 S | 10/1978 | Bros | D30/32 |
| 4,149,530 A * | 4/1979 | Gow | 128/36 |
| 4,167,036 A | 9/1979 | Kenney | 363/61 |
| 4,180,013 A * | 12/1979 | Smith | 119/29 |
| 4,218,990 A | 8/1980 | Forrest | 119/96 |
| D257,495 S | 11/1980 | Bros et al. | D30/32 |
| 4,242,715 A | 12/1980 | Laird | 361/232 |
| 4,337,496 A | 6/1982 | Laird | 361/232 |
| 4,370,696 A | 1/1983 | Darrell | 361/232 |
| 4,394,956 A | 7/1983 | Andrews et al. | 231/2 E |
| 4,656,969 A | 4/1987 | Rapp et al. | 119/51.11 |
| 4,667,431 A | 5/1987 | Mendicino | 43/6 |
| 4,717,384 A | 1/1988 | Waldeisen | 604/143 |
| 4,719,534 A | 1/1988 | Ward | 361/232 |
| 4,846,158 A * | 7/1989 | Teranishi | 128/36 |
| 4,852,454 A | 8/1989 | Batchelder | 89/1.11 |
| 4,875,253 A | 10/1989 | Lambooy | 17/1 E |
| 4,953,263 A | 9/1990 | Lambooy | 17/1 E |
| 4,958,628 A * | 9/1990 | Iwamoto et al. | 128/36 |
| 4,997,127 A | 3/1991 | McEwen | 231/7 |
| 5,193,528 A * | 3/1993 | Iwamoto et al. | 128/36 |
| 5,359,251 A | 10/1994 | Tsukimoto et al. | 310/323 |
| 5,408,956 A | 4/1995 | Quigley | 119/720 |
| 5,471,951 A | 12/1995 | Collins | 119/57.9 |
| 5,566,643 A | 10/1996 | Charter et al. | 119/220 |
| 5,749,324 A | 5/1998 | Moore | 119/719 |
| 5,868,100 A | 2/1999 | Marsh | 119/421 |
| 6,261,251 B1 * | 7/2001 | Meyers | 601/135 |

* cited by examiner

Primary Examiner—Thomas Price
(74) Attorney, Agent, or Firm—Lloyd W. Sadler

(57) ABSTRACT

A battery operated hand held device for use in handling or controlling livestock, particularly cattle, swine, sheep and horses. This invention provides a novel alternative to conventional electric livestock prods, which deliver an electric shock to the animal. While operating on the principle of external stimulus to invoke a flight response, this invention relies on vibration and/or sound rather than painful electric shock. This unique mode of action satisfies the needs in the livestock industry for low stress handling equipment and techniques with the welfare of the animal as a priority.

8 Claims, 3 Drawing Sheets

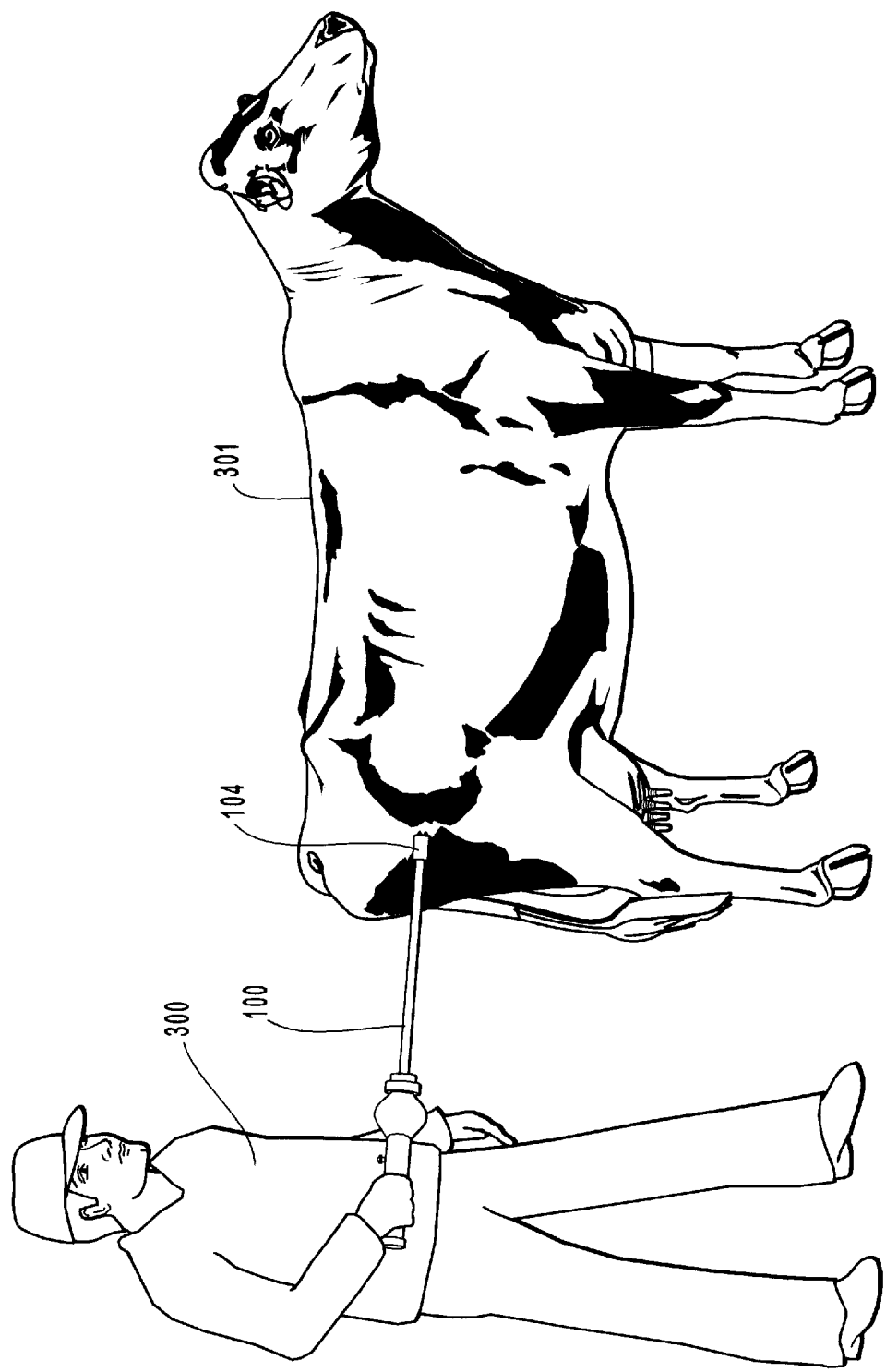

DEVICE FOR HANDLING LIVESTOCK USING VIBRATION AND NOISE AS A STIMULATION ON EXTERNAL PORTIONS OF THE BODY

BACKGROUND OF INVENTION

1. Field of the Invention

This invention relates to devices for the handling and control of livestock. More specifically, this invention relates to devices for initiating the movement of livestock by provoking a flight response from the animal by introducing an external stimulus to the animal. Still more specifically, this invention relates to devices that provoke movement of livestock by applying the vibrating head of the battery powered handheld unit to the external portions of the animal such as the sides and rump causing discomfort but no pain, persuading the animal to move in the desired direction.

2. Description of Related Art

Intensive livestock production has evolved into an industry that processes millions of animals each year. Livestock handling often requires the handler to use a handling tool when moving animals. The animals are typically moved through a stressful handling and processing procedure inside buildings and/or into transport trucks. Since domestic animals are often hesitate or will refuse to willingly enter a dark and/or foreign handling area, a handling tool is typically used to invoke forward movement by the animals. The most common animal handling tool currently in use is the electric livestock prod, which delivers a painful electric shock to exterior areas of the animal. Generally, electric prods are not designed for use on swine, sheep and horses, but nevertheless, such prods are regularly used on these animals. Abuse of animals can and does occur due to overuse or indiscriminate prodding of livestock that either cannot or will not move. Subsequent damage to the livestock in the form of bruising and debilitating injury is common and often this injury is directly attributable to misuse of the electric prod. In the case of swine, stress related death is common and can be a direct result of electric prod abuse. Animal welfare practices are being adopted by livestock groups at an ever-increasing rate and electric prod abuse and future elimination of this painful tool is becoming a popular topic.

Other tools utilized to move livestock include the sort stick, a handheld fiberglass pole, which can also be misused causing bruising and injury to the animals, and the sort paddle, a popular, handheld, lightweight directional aid that does not cause harm to the animals. Since most domestic livestock respond readily to any external stimulus, the invention described herein fits well into the category of a viable, economical, pain free and ethical alternative to conventional livestock handling tools.

The reader is referred to the following U.S. patent documents for general background material, each of which is hereby incorporated by reference in its entirety for the material contained therein: 4,006,390, 4,084,218, 4,167,036, 4,21 8,990, 4,242,71 5, 4,337,496, 4,370,696, 4,394,956, 4,667,431, 4,717,384, 4,71 9,534, 4,852,454, 4,875,253, 4,953,263, 4,997,127, 5,359,251, 5,471,951, 5,566,643, 5,624,592, 5,749,324, D244,626, D250,050, D257,495.

SUMMARY OF INVENTION

It is desirable to provide a livestock-handling device, which can effectively move livestock using external stimulus without injuring the animals. Moreover, it is particularly desirable to provide such a device that is cost-effective, easy to use, and is a humane tool for managing animals.

Therefore, it is the general object of this invention to provide a device which when applied to external areas of livestock, such as sheep, swine, horses and cattle will induce forward movement by utilizing vibration and noise stimulus.

It is another object of this invention to provide a device, which is battery power, which can be used to induce movement of livestock.

Another object of this invention is to provide an easy to operate and maintain, handheld device to move livestock.

A further object of this invention is to provide a handheld device for moving livestock that does not injure the animals.

A still further object of this invention is to provide a unique livestock-handling device that is cost effective to make and use.

It is a still further object of this invention is to provide a livestock-handling device the use of which reduces painful, stressful and costly bruising, carcass damage and stress related deaths to animals.

These and other objects of this invention are achieved by the device herein described and are readily apparent to those of ordinary skill in the art upon review of the following drawings, detailed description and claims.

BRIEF DESCRIPTION OF DRAWINGS

In order to show the manner that the above recited and other advantages and objects of the invention are obtained, a more particular description of the preferred embodiment of this invention, which is illustrated in the appended drawings, is described as follows. The reader should understand that the drawings depict only the present preferred and best mode embodiments of the invention, and these drawings should not be considered as limiting in scope. A brief description of the drawings is as follows:

FIG. 3 is a drawing showing the invention in use.

Reference will now be made in detail to the present preferred embodiment of the invention, examples of which are illustrated in the accompanying drawings.

DETAILED DESCRIPTION

This invention is a device for use in handling or controlling livestock, particularly cattle, swine, sheep and horses. Rather than electric shock, this invention makes use of physical vibration and/or noise to invoke a flight response from the animal. The present preferred embodiment of this invention is battery powered and adapted to be easily hand held by the user. In its preferred use the user holds the handle with one hand and positions the head of the prod of this invention to make contact with an external portion of the animal in close confines, usually a side or rump of the animal. The user then presses the activation button, which causes the motor in the head of the prod to be energized and to begin to vibrate and/or emit a noticeable sound. The vibration and/or sound thereby generated services to stimulate the animal into a flight response and subsequent movement.

Figure 1:
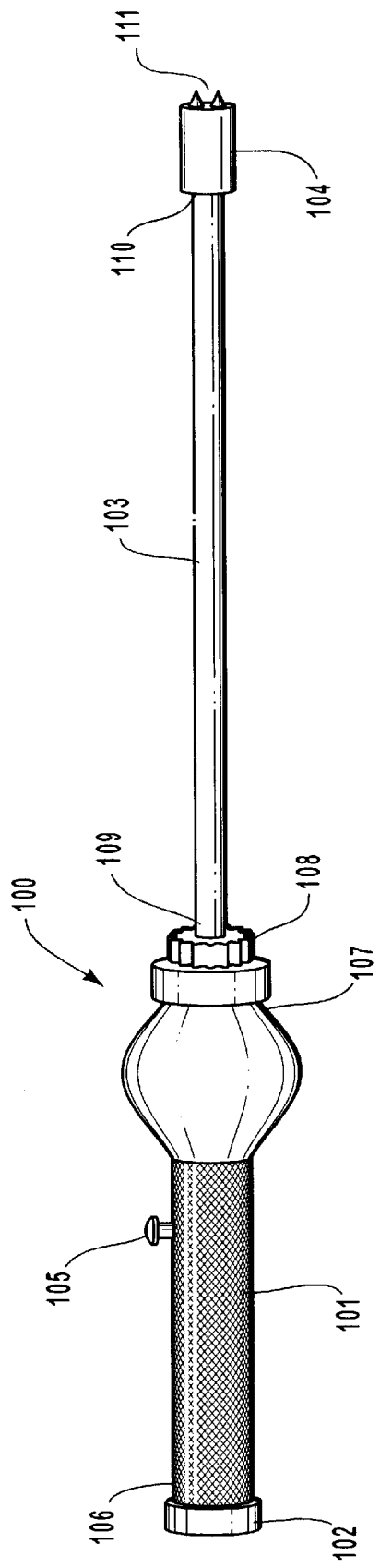
FIG. 1 is a representative drawing of the present preferred embodiment of the invention.

FIG. 1 shows a representative drawing of the present preferred embodiment of the invention 100. A handle 101 is provided for the user's physical holding and control of the invention 100. In its present preferred embodiment, the handle 101 is made of a non-conducting material, such as plastic, fiber wound composite, wood, rubber, or electrically insulated metal. An endpiece 102 is provided on the handle 101 to provide an access portal for the interior of the handle 101, where operating circuitry and batteries are stored. The preferred endpiece 102 has a threaded interface, as does the first end 106 of the preferred handle 101. Accordingly, the preferred endpiece 102 is threadingly attached to the handle 101. Attached to the second end 107 of the handle 101 is a wand mount 108. Fixed in the wand mount 108 is the first end 109 of a wand 103. The preferred wand 103 is made of semi-flexible plastic, although alternative materials, including but not necessarily limited to ABS plastic, fiber wound composite, insulated metal, and the like can be substituted without departing from the concept of this invention. A vibration head 104 is attached to the second end 110 of the wand 103 in order to facilitate the generation of noise when the vibration head 104 is activated by the motor 203, shown in FIG. 2. Also, in the present preferred embodiment of this invention, an electronic noise circuit 204 is provided. This noise circuit 204 consists of an electronic integrated circuit and a speaker device. Electrical power is provided by the battery 202 via the electrical conductor 201. In the preferred embodiment of this invention the vibration head 104 is composed of ABS plastic with stationary contact points 111, which is in mechanical communication with a motor 203 and which transfers the vibration to the animal when activated by the motor. The contact points 111 may be steel or high impact plastic or other equally suitable material. In alternative embodiments of this invention, the entire head 104 is movable and adapted to vibrate upon activation from the motor. An activation button 105 or switch is provided on the handle 101 to permit the user to turn on and off the activation of the vibration head 104.

Figure 2:
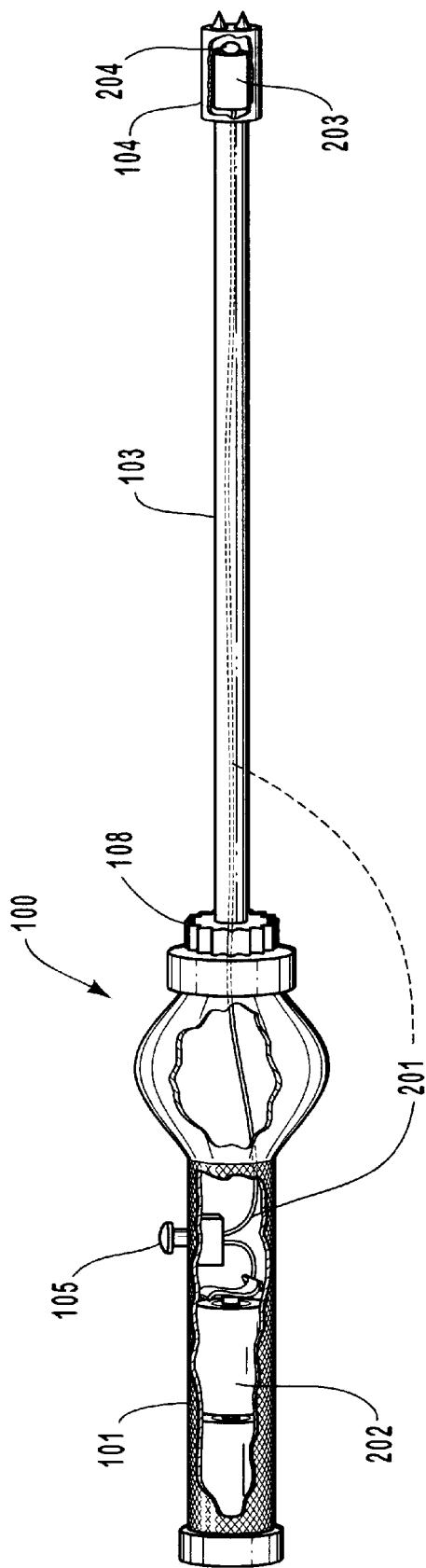
FIG. 2 is a detailed section drawing showing the electric components of the preferred embodiment of the invention.

FIG. 2 shows a detailed section view of the electric components of the preferred embodiment of the invention 100, via a cut-away section view. Within the handle 101 are one or more batteries 202. An electrical conductor 201 provides an electrical communication with the motor 203, through the button or switch 105. The electrical conductor 201 passes through the hollow interior of the handle 102, the wand mount 108 and the wand 103 to reach the motor 203. The motor 203 is preferably located within the vibration head 104, although in alternative embodiments of the invention the motor 203 may be located in the handle with a mechanical drive device, such as a piston, spring, rod or the like used to communicate mechanical energy from the motor 203 to the vibration head 104. In sum, when the button 105 is pressed, the switch associated with the button is closed completing the circuit between the battery 202 and the motor 203, thereby providing current to the motor 203. The motor 203 once powered activates the vibration head 104, causing mechanical vibration and noise.

FIG. 3 shows the invention 100 in use. In use the invention is activated by a user 300 who presses on the button 105, thereby causing the motor 203 to be powered by the battery (or batteries) 202. The powered motor 203 activates vibration in the vibration head 104 causing both mechanical vibration and associated noise which, when brought into close proximity or contact with an animal 301, stimulates the animal 301 into a flight response. Accordingly, this invention 100 provides a livestock handling/control device which uses vibration and noise to stimulate an animal 301 into movement. It is expected that as use of this invention becomes common with a group of animals, the noise created will be sufficient to induce movement. Nevertheless, the vibration is calibrated to provide force insufficient to cause any physical injury to the animal 301.

The foregoing description is of a preferred embodiment of the invention and has been presented for the purposes of illustration and description of the best mode of the invention currently known to the inventors. This description is not intended to be exhaustive or to limit the invention to the precise form, connections, or choice of components disclosed. Obvious modifications or variations are possible and foreseeable in light of the above teachings. This embodiment of the invention was chosen and described to provide the best illustration of the principles of the invention and its practical application to thereby enable one of ordinary skill in the art to utilize the invention in various embodiments and with various modifications as are suited to the particular use contemplated by the inventor. All such modifications and variations are intended to be within the scope of the invention as determined by the appended claims when they are interpreted in accordance with the breadth to which they are fairly, legally and equitably entitled.

It should be understood that the above-described embodiments of the invention are to be considered in all respects only as illustrative of numerous and varied other embodiments, which may constitute applications of the principles of the invention. Although the embodiments shown and described herein make use of specific materials and shaped components, the invention is not limited thereto. Alternative embodiments, which may be readily devised by those skilled in the art, without departing from the concept of this invention, are contemplated by the inventor. The scope of this invention is indicated by the appended claims rather than by the foregoing description, which was provided in order that the present preferred embodiment of this invention be fully disclosed and described in a manner sufficient to enable the making and use of this invention by those of ordinary skill in the art. All devices, which come directly within the claims or within the meaning and range of equivalency of the claims, are to be embraced as being within the scope of the claims of this invention.

What is claimed is:

1. A device for stimulating movement in animals, comprising:

(A) a handle, having a first end and a second distal end;

(B) a wand, having a first end and a second distal end, wherein said first end is mechanically connected to said second distal end of said handle;

(C) a vibration head is attached to said second distal end of said wand;

(D) a motor within said vibration head to induce vibration forces in said vibration head;

(E) and an electronic noise circuit within said vibration head and in electrical communication with a power source.

2. A device for stimulating movement in animals, as recited in claim 1, further comprising an endpiece attached to said first end of said handle.

3. A device for stimulating movement in animals, as recited in claim 1, wherein said handle has an internal cavity.

4. A device for stimulating movement in animals, as recited in claim 3, further comprising a control button fitted into said handle and providing control to a switch within said internal cavity of said handle.

5. A device for stimulating movement in animals, as recited in claim 4, further comprising said power source within said internal cavity of said handle.

6. A device for stimulating movement in animals, as recited in claim 5, wherein said power source is in electrical communication with said motor.

7. A device for stimulating movement in animals, as recited in claim 6, wherein said electrical communication is enabled by the closure of said switch.

8. A device for stimulating movement in animals, as recited in claim 1, wherein said vibration forces produces noise.

* * * * *